United States Patent
Hoshino

(10) Patent No.: US 11,518,337 B2
(45) Date of Patent: Dec. 6, 2022

(54) SIDE AIRBAG DEVICE AND SEAT FOR VEHICLE PROVIDED WITH THE SAME

(71) Applicant: MAZDA MOTOR CORPORATION, Hiroshima (JP)

(72) Inventor: Masato Hoshino, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/403,604

(22) Filed: Aug. 16, 2021

(65) Prior Publication Data

US 2022/0111814 A1 Apr. 14, 2022

(30) Foreign Application Priority Data

Oct. 13, 2020 (JP) .............................. JP2020-172767

(51) Int. Cl.
*B60R 21/207* (2006.01)
(52) U.S. Cl.
CPC .................. *B60R 21/207* (2013.01)
(58) Field of Classification Search
None
See application file for complete search history.

(56) References Cited

U.S. PATENT DOCUMENTS

| 2006/0038386 A1* | 2/2006 | Shibayama ....... B60R 21/23138 |
| | | 280/730.2 |
| 2017/0182963 A1 | 6/2017 | Hiraiwa et al. |
| 2021/0094505 A1* | 4/2021 | Yamamoto ............ B60R 21/239 |

FOREIGN PATENT DOCUMENTS

| JP | 2017-119450 A | 7/2017 |
| JP | WO2018212021 A1 * | 1/2020 |

* cited by examiner

*Primary Examiner* — Faye M Fleming
(74) *Attorney, Agent, or Firm* — Studebaker & Brackett PC

(57) ABSTRACT

An airbag comprises an inside base cloth, an outside base cloth, and a regulating member (tether) provided between these. The regulating member is respectively joined to front and rear portions of the inside base cloth at front-side and rear-side joint portions. The longitudinal length between the front-side and rear-side joint portions of the regulating member is shorter than that between the front-side and rear-side joint portions of the inside base cloth. The rear-side joint portion is positioned on a forward side of a front end portion of a side frame (a first side frame) but on a rearward side of an imaginary line connecting a hip point and a center position of a shoulder portion of a human body dummy for side-collision test (AM50) seated in a vehicle seat in a side view. A back-portion protection area of the airbag is constituted by a part of the inside base cloth.

18 Claims, 5 Drawing Sheets

SIDE AIRBAG DEVICE AND SEAT FOR VEHICLE PROVIDED WITH THE SAME

BACKGROUND OF THE INVENTION

The present invention relates to a side airbag which is deployed between an occupant and a side wall portion (door) in a side collision (side impact) of an automobile.

Conventionally, a side airbag device which is configured to be rapidly deployed forwardly from a side portion of a seatback between the occupant and the door (side wall portion) when a vehicle-collision load is detected has been used for reducing the collision impact transmitted to an upper body of the occupant, such as a head portion or a chest portion, in the vehicle side collision.

Further, it has been proposed in order to reduce the above-described collision impact (load) more properly that a sub deployment portion is provided inside the seatback and this sub deployment portion is controlled to be deployed at the same time when the side airbag is deployed forwardly from the seatback side portion between the occupant and the side wall portion, whereby the seatback side portion can expand and move the occupant obliquely-forwardly in a cabin (see Japanese Patent Laid-Open Publication No. 2017-119450 (US2017/0182963 A1), for example).

According to the side airbag device disclosed in the above-described patent document, the collision impact transmitted to the occupant in the side collision can be reduced to a certain degree by enlarging a space between the occupant and the side wall portion, but the moving quantity of the occupant may be insufficient because the occupant is moved by way of the seatback.

Further, in a case where plural bag bodies (main deployment portion, sub deployment portion) are used to compatibly attain inward moving of the occupant and protection of the occupant side portion like the side airbag device disclosed in the above-described patent document, there is a concern that the airbag device becomes so large that the installation property of the airbag deice inside seatback, the designing property of the seat, and the riding comfortability of the vehicle may be deteriorated.

Herein, a structure in which the occupant is moved inwardly by a deployment pressure of the side airbag not by way of the seatback may be considered. In this case, it is necessary to consider a body structure of the occupant because a large load should be applied to a human skeleton of the occupant. That is, the resistance against the impact differs among a chest portion, an abdomen portion, a lumber portion, and the like. Further, considering the skeleton structure, the resistance against the impact differs depending on a shape of a bone's cross section, so that it is necessary to reduce the load applied to a part of the body having a small (slender) bone's cross section more compared to another part of the body. In other words, it is preferable that the collision load be applied to the part of the body having a larger bone's cross section.

SUMMARY OF THE INVENTION

An object of the present invention is to provide a side airbag device which can compatibly attain optimization of load distribution including the load applied to the high-resistance part of the skeleton structure of the human body and securement of the space between the occupant and the side wall portion and also which is so compact that the superior installation property can be provided.

The inventor of the present invention has paid attention to a change in the shape of the bone's cross section between a front side and a rear side of a rib which is part of the skeleton structure of the human body and conducted earnest investigations for achieving the ideal occupant protection by the side airbag.

In the rib structure, the bone's cross section at around the backbone (spine) of the rear side of the rib shows the large (thick) shape and the high resistance against the impact. Meanwhile, the bone's cross section at around a breast bone of the front side of the rib shows the small (slender) shape and the low resistance against the impact. Consequently, the inventor has found that the load distribution at the chest portion of the human body can be optimized by making a load-distribution ratio at the high-resistance part of the rib's rear side larger than that at the low-resistance part of the rib's front side.

The side airbag device according to the present invention for providing the optimized load distribution comprises an inflator fixed to a side frame extending in a vehicle vertical direction inside a side portion of a seatback of a vehicle seat, and an airbag deployed by inflation gas supplied from the inflator, wherein the airbag comprises an inside base cloth which is provided to face an occupant side, an outside base cloth which is provided to face an outward side, in a vehicle width direction, of the inside base cloth and to be joined to the inside base cloth at a whole peripheral portion thereof, and a regulating member which is provided between the inside base cloth and the outside base cloth, and the airbag has a side-portion protection area which is deployed at the occupant side in the vehicle vertical direction and a back-portion protection area which is deployed between a back portion of an occupant and the seatback, the regulating member is respectively joined to a front portion and a rear portion of the inside base cloth at a front-side joint portion and a rear-side joint portion, the length, in a vehicle longitudinal direction, between the front-side joint portion and the rear-side joint portion of the regulating member is set to be shorter than that between the front-side joint portion and the rear-side joint portion of the inside base cloth, whereby a joint state of the inside face cloth is loosened relative to the regulating member, the rear-side joint portion is set, in an airbag deployment state, to be positioned on a vehicle forward side of a front end portion of the side frame but on a vehicle rearward side of an imaginary line connecting a hip point and a center position of a shoulder portion of a human body dummy for side-collision (side-impact) test (AM50) seated in the vehicle seat in a vehicle side view, and the back-portion protection area of the airbag is constituted by a part of the inside base cloth, forward deployment of which is regulated by the regulating member.

According to the above-described present invention, in the airbag's deployment, the outside base cloth is deployed forwardly and in the vehicle vertical direction from inside the seatback's side portion so as to form the side-portion protection area to protect the side portion of the occupant. Meanwhile, the regulating member is joined to the inside base cloth. The inside base cloth is in a loosened state relative to the regulating member by setting in such a manner that the length, in the vehicle longitudinal direction, between the front-side joint portion and the rear-side joint portion of the regulating member is shorter than that between the front-side joint portion and the rear-side joint portion of the inside base cloth. Accordingly, the forward deployment of the inside base cloth is regulated (restricted) by the regulating member. A loosened part of the inside base cloth is deployed inwardly, in the vehicle width direction, instead of this forward deployment, so that the back-portion protection area is formed.

Thus, the part of the inside base cloth is deployed between the occupant's back portion and the seatback as the back-portion protection area. Thereby, the occupant can be moved inwardly greatly by reducing a gap between the occupant's back portion and the seatback properly and making the distribution ratio of the load applied to the high-resistance part of the rib's rear side properly large in the vehicle side collision.

That is, the upper body of the occupant can be rotated inwardly, in the vehicle width direction, by deploying (forming) the back-portion protection area at the occupant's back portion, so that the low-resistance part of the rib's front side of the occupant can be kept away from the door (side wall portion). The space between the occupant and the side wall portion in the vehicle side collision is so enlarged that the impact applied to the occupant can be reduced. Further, since the distribution ratio of the load applied to the low-resistance part of the rib's front side of the occupant is small, the ideal load-distribution ratio by means of the side airbag can be achieved.

Moreover, in the present side airbag device, the back-portion protection area is deployed such that the part of the inside base cloth goes around the occupant's back portion. That is, a part of the single airbag becomes the side-portion protection area and another part of the single airbag becomes the back-portion protection area. Therefore, it is unnecessary to provide plural airbags, so that the compact airbag can be provided.

Herein, in the above-described side airbag device, the gap, in the vehicle vertical direction, between the occupant's back portion and the seatback changes such that its upper side is larger than its lower side because a slant angle of the upper body of the occupant seated in the seat is different from a slant angle of the seatback in the vehicle side view. Therefore, in order to deploy the back-portion protection area appropriately according to this gap between the occupant's back portion and the seatback, the regulating member may be constituted by upper-side and lower-side regulating members which are provided side by side in the vehicle vertical direction, and the length, in the vehicle longitudinal direction, between the front-side joint portion and the rear-side joint portion of the lower-side regulating member may be shorter than that between the front-side joint portion and the rear-side joint portion of the upper-side regulating member.

According to this structure, the size of the deployed back-portion protection area can be changed according to the gap between the occupant's back portion and the seatback. Specifically, since the length, in the vehicle longitudinal direction, between the front-side joint portion and the rear-side joint portion of the upper-side regulating member is long relatively, an upper part of the back-portion protection area becomes large and a lower part of the back-portion protection area becomes small. Herein, while the gap between the occupant's back portion and the seatback at the upper side of the seatback is relatively large compared to that at the lower side of the seatback as described above, the upper part of the back-portion protection area is large so as to match this large gap, whereas the lower part of the back-portion protection area is small so as to match this small gap. Accordingly, the load-distribution ratio at the high-resistance part of the rib's rear side of the occupant can be made uniform.

Further, the above-described regulating member may be constituted by a single regulating member provided with the front-side joint portion and the rear-side joint portion which are respectively configured to extend in the vehicle vertical direction, and the front-side joint portion of the single regulating member may be configured to slant relative to the vehicle vertical direction such that the length, in the vehicle longitudinal direction, between the front-side joint portion and the rear-side joint portion of a lower side of the single regulating member is shorter than that between the front-side joint portion and the rear-side joint portion of an upper side of the single regulating member.

According to this structure, since the front-side joint portion is configured to slant such that the length, in the vehicle longitudinal direction, between the front-side joint portion and the rear-side joint portion of the lower side of the single regulating member is shorter than that between the front-side joint portion and the rear-side joint portion of the upper side of the single regulating member, even if the regulating member is a single, the upper part of the back-portion protection area becomes large and the lower part of the back-portion protection area becomes small like the above-described structure. Thus, the load-distribution ratio at the high-resistance part of the rib's rear side of the occupant can be made uniform so as to match a sitting state of the occupant.

In the above-described side airbag device, in order to appropriately restraint a side portion area of the occupant (including the chest portion, the abdomen portion, and the lumber portion), the above-described airbag may further have a chest-portion protection area for protecting the chest portion of the occupant and a lumber-portion protection area positioned below the chest-portion protection area, and the chest-portion protection area may be configured such that the length, in the vehicle longitudinal direction, thereof is shorter than that of the lumber-portion protection area in the airbag deployment state.

According to this structure, a recess portion is formed in the chest-portion protection area of the airbag which is recessed rearwardly from the lumber-portion protection area, so that the chest-portion protection area does not reach the rib's front side even when it is deployed forwardly. Accordingly, the distribution ratio of the load applied to the low-resistance part of the rib's front side in the vehicle side collision can be made properly small.

In the above-described side airbag device, in order to achieve the ideal load-distribution ratio at the high-resistance part of the skeleton structure of the occupant including the chest portion and the lumber portion, the airbag may further have a shoulder-portion protection area which is positioned above the chest-portion protection area, and the regulating member may be provided below the shoulder-portion protection area.

According to this structure, since no regulating member is provided in the shoulder-portion protection area, the shoulder-portion protection area can be greatly deployed forwardly. Meanwhile, in an area below the shoulder-portion protection area, the airbag is deployed between the occupant's back portion and the seatback by providing the regulating member, so that the load-distribution ratio at the rib's rear side and the lumber portion of the occupant can be made properly large. Thus, the ideal load-distribution ratio by means of the airbag can be achieved.

Further, since a front portion of the lumber-portion protection area is bent toward an vehicle inside by the regulating member and the lumber-portion protection area is deployed along an outer periphery of the lumber portion of the occupant's side portion, the impact load can be distributed at a whole part of the lumber portion.

Further, a vehicle seat which is provided with the above-described side airbag device according to the present invention may be configured such that the above-described airbag is configured such that the back-portion protection area is positioned on an inward side, in the vehicle width direction, of the side frame and the side-portion protection area is positioned on the outward side, in the vehicle width direction, of the side frame in a state where the airbag is stored inside the side portion of the seatback before deployment.

According to the above-described seat, it can be properly prevented that the back-portion protection area and the side-portion protection area interfere with each other when the airbag is deployed, so that the smooth deployment of the airbag at the occupant's side portion and the back portion can be attained.

The present invention will become apparent from the following description which refers to the accompanying drawings.

DETAILED DESCRIPTION OF THE INVENTION

Figure 1:
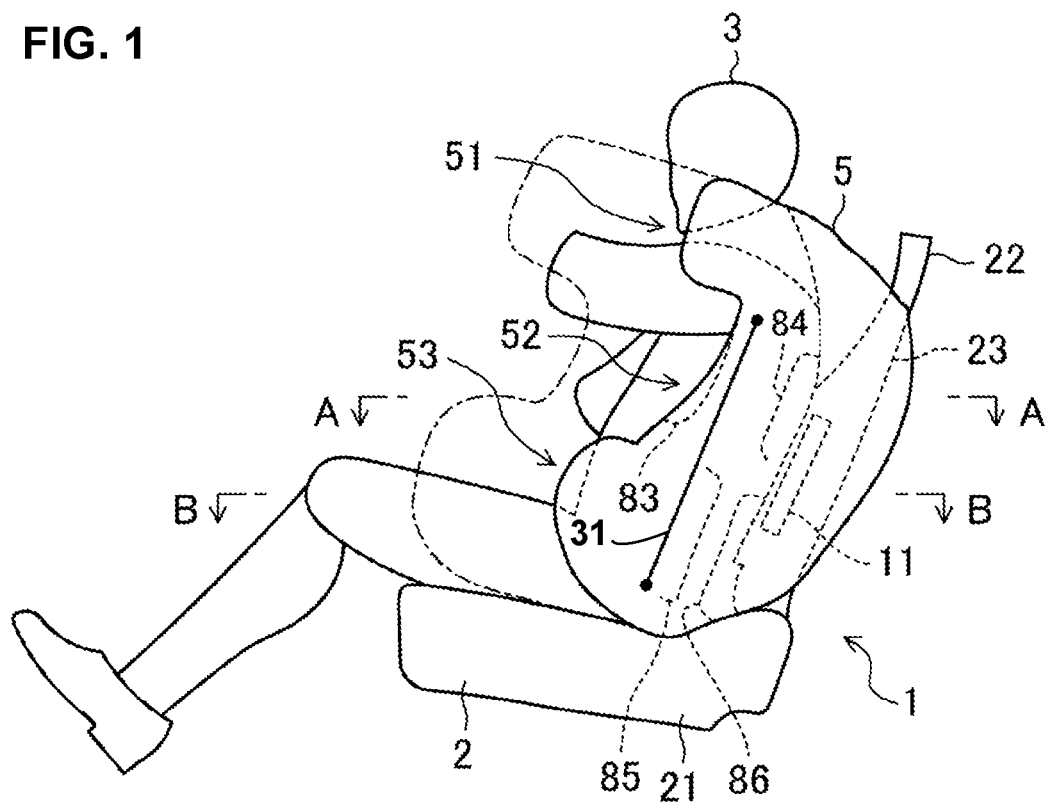
FIG. 1 is a side view showing a state where a side airbag is deployed beside an occupant seated in a seat according to an embodiment of the present invention.

Hereafter, each embodiment of a side airbag device and a seat for a vehicle will be described referring to the drawings. These are just exemplified structures of the side airbag device and the seat for the vehicle.

FIG. 1 shows a seat 2 for a vehicle which is provided with a side airbag device 1. The seat 2 is a first-row seat which is arranged at the foremost row in a cabin of the vehicle in the present embodiment. Herein, the seat 2 may be a second-row seat or a third-row seat which are arranged in back of the first-row seat.

Figure 3:
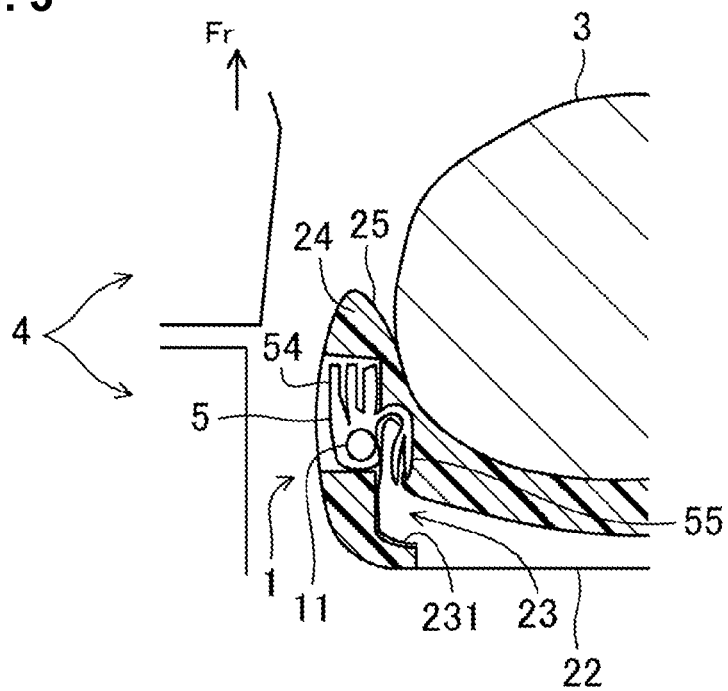
FIG. 3 is a plan sectional view showing a state where the airbag of the embodiment of the present invention is stored inside a seatback.

As shown in FIG. 3, a side wall portion 4 of the vehicle is provided on a left side, i.e., on an outward side, in a vehicle width direction, of the seat 2. The side wall portion 4 is a door, a pillar, or the like, for example. The side wall portion which corresponds to the first-row seat is a front door, a B pillar, or the like, for example. The side wall portion which corresponds to the second-row seat is a rear door, a C pillar, or the like, for example. The side wall portion which corresponds to the third-row seat is a tire house, a quarter pillar, or the like, for example. The seat 2 which is exemplified here is the one which is positioned at a left side in the cabin. Herein, this seat 2 may be the one which is positioned at a right side in the cabin.

Figure 2:
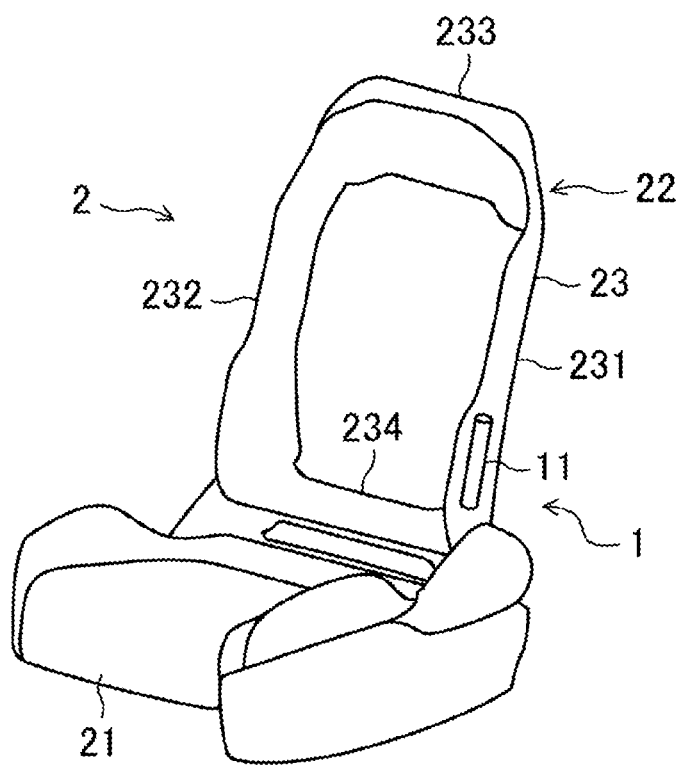
FIG. 2 is a perspective view showing a seat frame where an inflator is fixed according to the embodiment of the present invention.

FIGS. 2 and 3 exemplify the seat 2 for the vehicle. The seat 2 comprises a seat cushion 21 and a seatback 22. The seat cushion 21 is a portion where an occupant 3 is seated. The seatback 22 is configured to stand upwardly at a rear end portion of the seat cushion 21. The seatback 22 supports a back portion of the occupant 3. Herein, a headrest, not illustrated, is attached to an upper end portion of the seatback 22.

The seatback 22 comprises a seat frame 23, a seat pad 24, and a skin 25. The seat pad 24 is provided to cover a periphery of the seat frame 23. The skin 25 is covers over the seat pad 24. In FIGS. 1 and 2, illustration of the seat pad 24 and the skin 25 is omitted, and the seat frame 23 is only illustrated.

The seat fame 23 comprises a first side frame 231, a second side frame 232, an upper frame 233, and a lower frame 234. The first side frame 231 is positioned on the outward side in the vehicle width direction, of the seat and the second side frame 232 is positioned on an inward side, in the vehicle width direction, of the seat. The first-and-second side fames 231, 232 are respectively configured to extend in a vertical direction.

The upper frame 233 interconnects respective upper ends of the first-and-second side frames 231, 232 in the vehicle width direction, and the lower frame 234 interconnects respective lower ends of the first-and-second side frames 231, 232 in the vehicle width direction.

The first-and-second side frames 231, 232 of the seat frame 23 are respectively made by bending a metal plate in such a manner that each cross section has a nearly U shape (see FIG. 3).

The side airbag device 1 is attached to an outside face of the first side frame 231. That is, the side airbag device 1 is provided inside a side portion of the seatback 22 of the seat 2.

The side airbag device 1 is provided with an airbag 5 and an inflator 11. The airbag 5 is stored inside the side portion of the seatback 22 in a folded state. The airbag 5 is deployed by inflation gas supplied from the inflater 11 in such a manner that it expands outside, breaking the seat pad 24 and the skin 25.

As shown in FIGS. 1-3, the inflator 11 is of a slender cylindrical shape and attached to an outside face of the first side frame 231 such that it extends along the first side frame 231. Herein, the type of the inflator 11 is not limited at all. Any type of inflator is applicable in the side airbag device 1.

Figure 4:
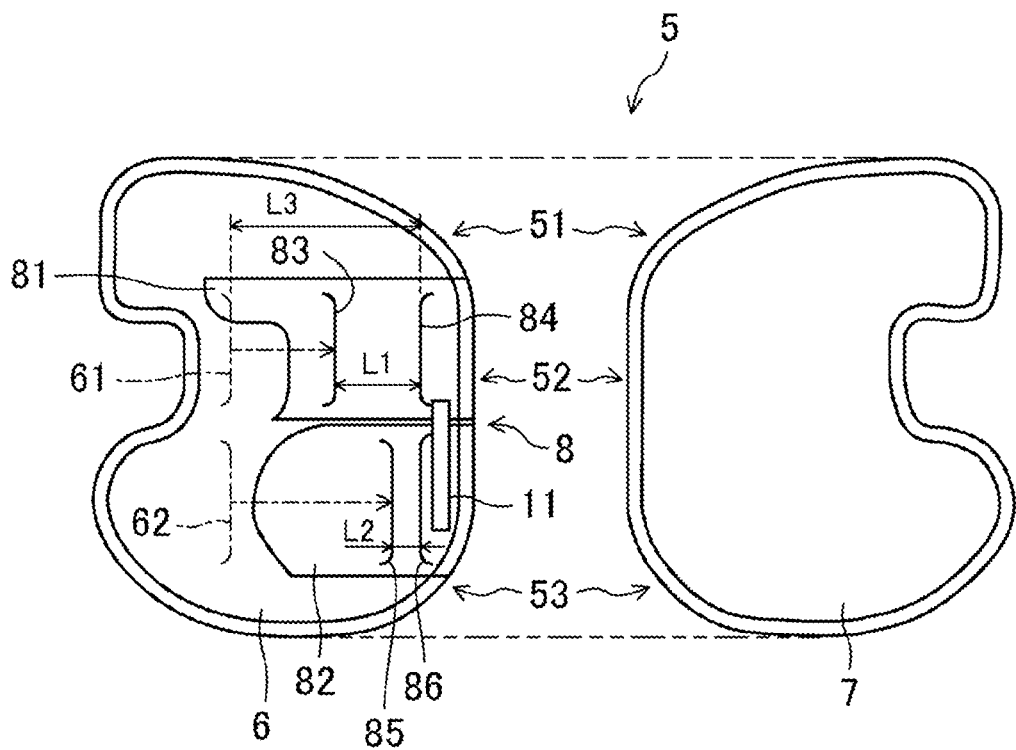
FIG. 4 is a plan view showing an inside base cloth and an outside base cloth of the airbag of the present invention which are in an exploded state.

FIG. 4 exemplifies the airbag 5. The airbag 5 comprises an inside base cloth 6, an outside base cloth 7, and a tether 8 as a regulating (restricting) member. The outside base cloth 6, the outside base cloth 7, and the tether 8 are respectively made of a cloth which may have no elasticity or little elasticity.

The inside base cloth 6 is positioned on the inward side, in the vehicle width direction, of the airbag. The inside base cloth 6 is provided to face the side of the occupant 3 seated in the seat 2. The outside base cloth 7 is provided to face an outward side, in the vehicle width direction, of the inside base cloth 6. The airbag 5 is formed in a bag shape by the inside base cloth 6 and the outside base cloth 7 which are sewed together at their whole peripheral edge parts. FIG. 4 shows a state where their sewing is released and the inside base cloth 6 and the outside base cloth 7 are expanded to the right and to the left, respectively. That is, respective faces of the inside base cloth 6 and the outside base cloth 7 which are shown in FIG. 4 constitute an inner face of the bag-shaped airbag 5. A left side of the inside base cloth 6 which is illustrated on the left of FIG. 4 corresponds to a vehicle forward side, and a right side of the inside base cloth 6 which is illustrated on the right of FIG. 4 corresponds to a vehicle rearward side. A right side of the outside base cloth 7 which is illustrated on the right of FIG. 4 corresponds to the vehicle forward side, and a left side of the outside base cloth 7 which is illustrated on the left of FIG. 4 corresponds to the vehicle rearward side. A lateral direction in FIG. 4 corresponds to a vehicle longitudinal direction.

As shown in FIGS. 1 and 4, the airbag 5 has a shoulder-portion protection area 51, a chest-portion protection area 51, and a lumber-portion protection area 53 which are arranged in the vertical direction of the airbag 5. The shoulder-portion protection area 51 is an upper part of the airbag 5. The shoulder-portion protection area 51 protects a shoulder portion of the occupant 3 primarily. The chest-portion protection area 52 is positioned below the shoulder-portion protection area 51. The chest-portion protection area 52 is a middle part of the airbag 5. The chest-portion protection area 52 protects a chest portion of the occupant 3 primarily. The lumber-portion protection area 53 is positioned below the chest-portion protection area 52. The lumber-portion protection area 53 is a lower part of the airbag 5. The lumber-portion protection area 53 protects a lumber portion of the occupant 3 primarily.

As shown in FIG. 4, each of the inside base cloth 6 and the outside base cloth 7 is configured such that the length, in the longitudinal direction, of the shoulder-portion protection area 51 and the lumber-portion protection area 53 is relatively long and the length, in the longitudinal direction, of the chest-portion protection area 52 is shorter than that of the shoulder-portion protection area 51 and the lumber-portion protection area 53. Thereby, the airbag 5 is configured as shown in FIG. 1 such that the chest-portion protection area 52 is recessed rearwardly from the shoulder-portion protection area 51 and the lumber-portion protection area 53 when the airbag 5 is deployed. The airbag 5 is formed in a nearly inverse-C shape in the vehicle side view.

The tether 8 is provided between the inside base cloth 6 and the outside base cloth 7. As shown in FIG. 4, the tether 8 includes an upper-side tether 81 and a lower-side tether 82. The upper-side tether 81 and the lower-side tether 82 are provided side by side in the vertical direction.

The upper-side tether 81 is located at a level in the vertical direction which substantially corresponds to the chest-portion protection area 52. The upper-side tether 81 extends forwardly from a rear end of the inside base cloth 6. A front end of the upper-side tether 81 extends up to around a front end of the chest-portion protection area 52 of the inside base cloth 6. Herein, in the embodiment shown in FIG. 4, a part of an front end edge of the upper-side tether 81 is cut out rearwardly.

The lower-side tether 82 is located at a level in the vertical direction which substantially corresponds to the lumber-portion protection area 53. The lower-side tether 82 extends forwardly from the rear end of the inside base cloth 6. A front end of the lower-side tether 82 extends up to around a middle part of the lumber-portion protection area 53 of the inside base cloth 6. Herein, in the embodiment shown in FIG. 4, a front end edge of the lower-side tether 82 is curved forwardly in a convex shape. The length, in the longitudinal direction, of the lower-side tether 82 is different from the length, in the longitudinal direction, of the upper-side tether 81. The upper-side tether 81 is longer than the lower-side tether 82.

The upper-side tether 81 and the lower-side tether 82 are respectively joined to the inside base cloth 6 by sewing. More specifically, the upper-side tether 81 is joined to the inside base cloth 6 at two points of a front-side joint portion 83 and a rear-side joint portion 84. Likewise, the lower-side tether 82 is joined to the inside base cloth 6 at two points of a front-side joint portion 85 and a rear-side joint portion 86.

The rear-side joint portion 84 is constituted by sewing respective rear portions of the inside base cloth 6 and the upper-side tether 81 which overlap each other. Meanwhile, the front-side joint portion 83 is constituted by reeling a front end portion 61 of the inside base cloth 6, which is shown by a dotted line in FIG. 4, rearwardly (see an arrow shown by a dotted line in FIG. 4) and sewing this reeled portion and a middle part of the upper-side tether 81.

Further, the rear-side joint portion 86 is constituted by sewing respective rear portions of the inside base cloth 6 and the lower-side tether 82 which overlap each other. Meanwhile, the front-side joint portion 85 is constituted by reeling a middle portion 62 of the inside base cloth 6, which is shown by another dotted line in FIG. 4, rearwardly (see another arrow shown by another dotted line in FIG. 4) and sewing this reeled portion and a middle part of the lower-side tether 82.

Herein, a length L1, in the vehicle longitudinal direction, between the front-side joint portion 83 and the rear-side joint portion 84 of the upper-side tether 81 and a length L2, in the vehicle longitudinal direction, between the front-side joint portion 85 and the rear-side joint portion 86 of the lower-side tether 82 are respectively shorter than a length L3, in the vehicle longitudinal direction, between the front-side joint portions 83, 85 and the rear-side joint portions 84, 86 of the inside base cloth 6. Herein, the length L3 is a length extending along a cloth surface of the inside base cloth 6. The above-described joining of the upper-side tether 81 and the lower-side tether 82 to the inside base cloth 6 makes a loosened state of the inside base cloth 6 where the inside base cloth 6 is loosened between the front-side joint portions 83, 85 and the rear-side joint portions 84, 86, specific illustration of which is omitted. An actual position of a front end edge of the inside base cloth 6 is located on the rearward side of the position exemplified in FIG. 4.

Further, the length L2, in the vehicle longitudinal direction, between the front-side joint portion 85 and the rear-side joint portion 86 of the lower-side tether 82 is shorter than the length L1, in the vehicle longitudinal direction, between the front-side joint portion 83 and the rear-side joint portion 84 of the upper-side tether 81.

FIG. 1 shows a state where the above-described airbag 5 is deployed by the inflation gas supplied from the inflater 11. When a collision detection sensor, not illustrated, which is attached to the side wall portion 4 detects the vehicle side collision, a control device, not illustrated, receives a detection signal of the collision detection sensor and then outputs an operation (activation) signal to the inflator 11. Thereby, the airbag 5 is deployed.

The airbag 5 has a side-portion protection area 54 which is deployed at a side portion of the occupant 3 and a back-portion protection area 55 which is deployed at a back portion of the occupant 3.

Figure 5:
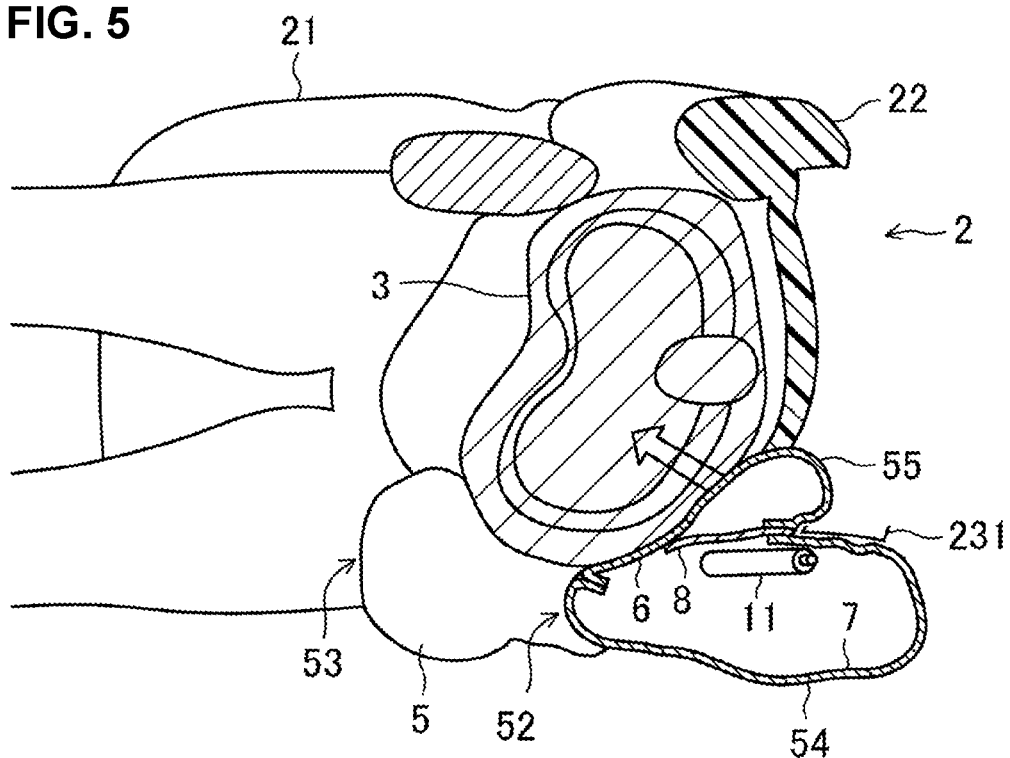
FIG. 5 is a plan sectional view taken along line A-A of FIG. 1.
Figure 6:
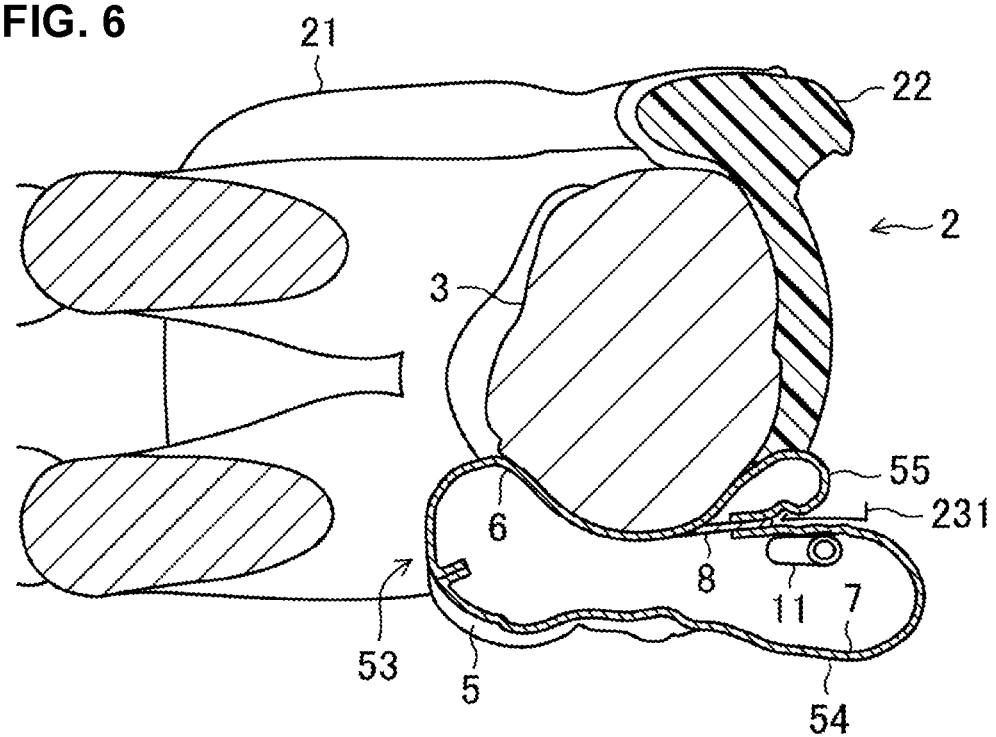
FIG. 6 is a plan sectional view taken along line B-B of FIG. 1.

FIG. 5 shows an A-A section of FIG. 1. The A-A section corresponds to the level of the chest portion of the occupant 3. FIG. 6 shows a B-B section of FIG. 1. The B-B section corresponds to the level of the lumber portion of the occupant 3.

As shown in FIGS. 5 and 6, the side-portion protection area 54 is formed by the outside base cloth 7 which is substantially positioned on the outward side, in the vehicle width direction, of the tether 8, and the back-portion protection area 55 is formed by the inside base cloth 6 which is substantially positioned on the inward side, in the vehicle width direction, of the tether 8.

That is, the outside base cloth 7 is deployed forwardly and in the vehicle vertical direction from the side portion of the seatback 22. The outside base cloth 7 forms the side-portion protection area 54 which protects the side portion of the occupant 3.

Meanwhile, the upper-side tether 81 and the lower-side tether 82 are joined together by sewing at the inside base cloth 6. The length L1, L2, in the vehicle longitudinal direction, between the front-side joint portions 83, 85 and the rear-side joint portions 84, 86 of the upper-side tether 81 and the lower-side tether 82 is the length L3, in the vehicle longitudinal direction, between the front-side joint portions 83, 85 and the rear-side joint portions 84, 86 of the inside base cloth 6. Accordingly, the inside base cloth 6 is suppressed from being deployed forwardly by the upper-side tether 81 and the lower-side tether 82.

A dotted line shown in FIG. 1 imaginarily shows a shape of a front end of the inside base cloth 6 when the inside base cloth 6 where the tether 8 is not joined is deployed. As apparent from this figure, forward deployment of the inside base cloth 6 is regulated (restricted).

The part of the inside base cloth 6 which is positioned at the level where the upper-side tether 81 and the lower-side tether 82 are provided is deployed inwardly in the vehicle width direction instead of its forward deployment. That is, the inside base cloth 6 which is loosened between the front-side joint portions 83, 85 and the rear-side joint portions 84, 86 is deployed between the back portion of the occupant 3 and the seatback 22 as the back-portion protection area 55. The back-portion protection area 55 reduces a space formed between the back portion of the occupant 3 and the seatback 22 and applies a load which is directed toward an inward side, in the vehicle width direction, to a rib's rear side of the occupant 3 as shown by a white arrow in FIG. 5. Thereby, the occupant 3 is moved in such a manner that the upper body is twisted toward the inward side, in the vehicle width direction, so that a space between the occupant 3 and the side wall portion 4 expands. Consequently, the collision impact applied to the occupant 3 in the vehicle side collision can be reduced.

Herein, in a skeleton structure of a human body, a bone's cross section at around a backbone (spine) of the rib's rear side shows the large (thick) shape and the high resistance against the impact as schematically shown in FIG. 5. Meanwhile, the bone's cross section at around a breast bone of the rib's front side shows the small (slender) shape and the low resistance against the impact. Since the back-portion protection area 55 is deployed between the back portion of the occupant 3 and the seatback 22, a load-distribution ratio at the high-resistance part of the rib's rear side becomes larger than that at the low-resistance part of the rib's front side. That is, the above-described airbag 5 can optimize the load distribution at the chest portion of the occupant 3.

Further, the airbag 5 is configured such that the length, in the longitudinal direction, of the chest-portion protection area 52 is shorter than the length, in the longitudinal direction, of each of the shoulder-portion protection area 51 and the lumber-portion protection area 53 and the front end of the chest-portion protection area 52 is recessed rearwardly even in a case where the airbag 5 is deployed (see FIGS. 1 and 5). This structure can also suppress the impact load from being applied to the low-resistance part of the rib's front side.

As shown in FIG. 1, the rear-side joint portions 84, 86 are respectively set, in the deployment state of the airbag 5, to be positioned on the vehicle forward side of a front end portion of the first side frame 231 but on the vehicle rearward side of an imaginary line 31 which connects a hip point and a center position of the shoulder portion of the occupant 3 seated in the vehicle seat in a vehicle side view. Herein, the occupant 3 is configured to be a human body dummy for side-collision test (AM50). This dummy is the AM50 model (which is defined as the human dummy model which covers 50% of American male adults) of the international standard side-impact (side-collision) dummy (World SID 50th Percentile), for example. Thus, the tether 8 can regulate (restrict) the forward deployment of the inside base cloth 6, so that the airbag 5 can be deployed properly between the back portion of the occupant 3 and the seatback 22.

Further, the length L2, in the vehicle longitudinal direction, between the front-side joint portion 83 and the rear-side joint portion 84 of the lower-side tether 82 is shorter than the length L1, in the vehicle longitudinal direction, between the front-side joint portion 85 and the rear-side joint portion 86 of the upper-side tether 81. Thereby, the upper part of the back-portion protection area 55 is deployed widely as shown in FIG. 5 and its lower part is deployed narrowly as shown in FIG. 6.

As shown in FIG. 1, because a slant angle, in the vehicle side view, of the upper body of the occupant 3 seated in the seat and a slant angle of the seatback 22 differs from each other, a gap between the back portion of the occupant 3 and the seatback 22 changes in the vehicle vertical direction such that its upper side corresponding to the upper part of the seatback 22 is wider than its lower side corresponding to the lower part of the seatback 22. Herein, the back-portion protection area 55 is deployed in such a manner that its upper part is deployed widely and its lower part is deployed narrowly, so that the back-portion protection area 55 is deployed so as to match the size of the above-described gap between the back portion of the occupant 3 and the seatback 22. Accordingly, the load-distribution ratio at the high-resistance part of the rib's rear side of the occupant 3 can be made uniform.

Further, since the back-portion protection area 55 at the lower part of the inside base cloth 6 is small, the lower part of the inside base cloth 6 can be deployed forwardly. Meanwhile, in a case where the inside base cloth 6 and the outside base cloth 7 are compared with each other, the forward deployment of the inside base cloth 6 is regulated (restricted) by the lower-side tether 82 more than the deployment of the outside base cloth 7. Consequently, as shown in FIG. 6, in the lumber-portion protection area 53, the front portion of the airbag 5 is bent inwardly, in the vehicle width direction, so that the airbag 5 is deployed along an outer periphery of the lumber portion of the occupant's side portion. Thereby, the airbag 5 can distribute (disperse) the impact load at a whole part of the lumber portion.

Further, the tether 8 is provided at the chest-portion protection area 52 and the lumber-portion protection area 53, but not at the shoulder-portion protection area 51. The shoulder-portion protection area 51 can be deployed forwardly widely and protect the side of the shoulder portion of the occupant 3. With respect to a position below the shoulder-portion protection area 51, the airbag 5 is deployed between the back portion of the occupant 3 and the seatback 22, whereby the load-distribution ratio at the rib's rear side and the lumber portion can be made large. Thus, the ideal load-distribution ratio can be achieved (attained) by means of the airbag 5.

The airbag 5 which has not be inflated yet is stored inside the side portion of the seatback 22 in the folded state as shown in FIG. 3. Herein, the part of the airbag 5 which constitutes the back-portion protection area 55 is positioned on the inward side, in the vehicle width direction, of the first side frame 231 (i.e., on the right side in FIG. 3), and the part of the airbag 5 which constitutes the side-portion protection area 54 is positioned on the outward side, in the vehicle width direction, of the first side frame 231 (i.e., on the left side in FIG. 3). When the airbag 5 is deployed, the back-portion protection area 55 can be deployed on the inward side, in the vehicle width direction, of the first side frame 231 and inwardly, without interfering with the side-portion protection area 54, and the side-portion protection area 54 can be deployed on the outward side, in the vehicle width direction, of the first side frame 231 and outwardly, without interfering with the back-portion protection area 55 (see FIGS. 5 and 6). Thus, the smooth deployment of the airbag 5 at the side portion and the back portion of the occupant can be attained.

Moreover, in the present side airbag device 1, the back-portion protection area 55 is deployed such that the part of the inside base cloth 6 goes around the back portion of the occupant 3. That is, a part of the single airbag 5 becomes the side-portion protection area 54 and another part of the single airbag 5 becomes the back-portion protection area 55. Therefore, it is unnecessary to provide plural airbags, so that the compact airbag 5 can be provided. Thus, the installation property of the side airbag device 1 can be improved.

Figure 7:
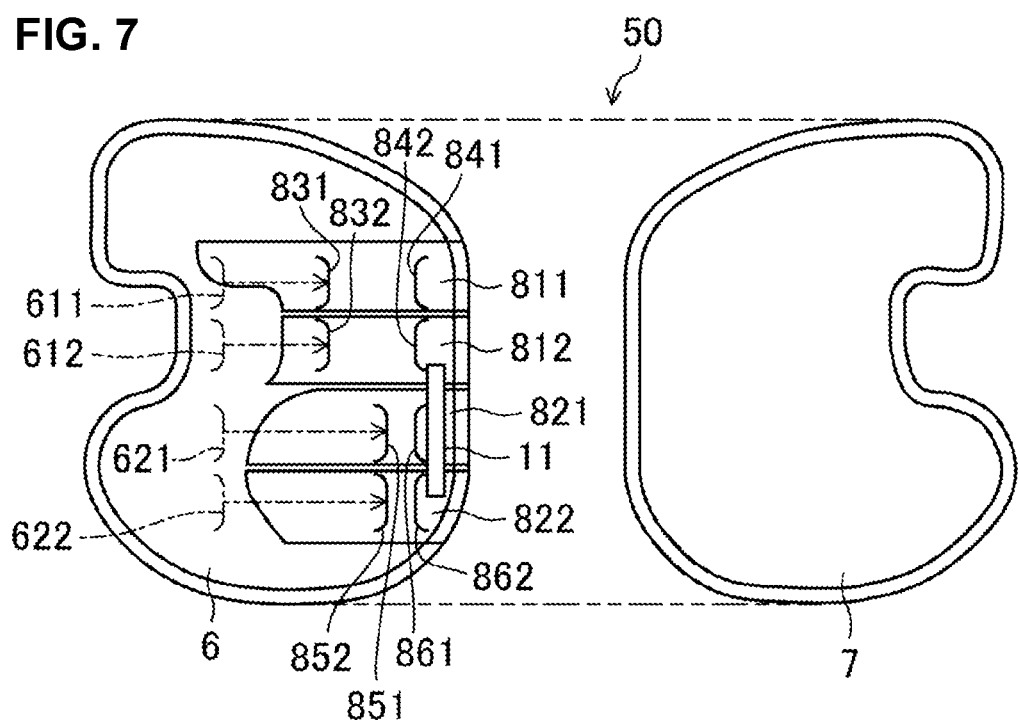
FIG. 7 is a plan sectional view showing an airbag according to a modification of the present invention, which corresponds to FIG. 4.

Herein, the structure of the side airbag device is not limited to the above-described one. FIG. 7 shows a modification of the airbag. A modified airbag 50 is configured such that the upper-side tether 81 is divided into a first upper-side tether 811 and a second upper-side tether 812, and the lower-side tether 82 is divided into a first lower-side tether 821 and a second lower-side tether 822.

The first upper-side tether 811 and the second upper-side tether 812 are respectively provided with front-side joint portions 831, 832 and rear-side joint portions 841, 842. A longitudinal position of the front-side joint portions 831, 832 is the same as a position of the above-described front-side joint portion 83, and a longitudinal position of the rear-side joint portions 841, 842 is the same as a position of the above-described rear-side joint portion 84. Reeled portions 611, 612 of the inside base cloth 6 which are reeled rearwardly are the same as the above-described ones as well.

Likewise, the first lower-side tether 821 and the second lower-side tether 822 are respectively provided with front-side joint portions 851, 852 and rear-side joint portions 861, 862. A longitudinal position of the front-side joint portions 851, 852 is the same as a position of the above-described front-side joint portion 85, and a longitudinal position of the rear-side joint portions 861, 862 is the same as a position of the above-described rear-side joint portion 86. Reeled portions 621, 622 of the inside base cloth 6 which are reeled rearwardly are the same as the above-described ones as well.

The side airbag device 1 provided with this airbag 50 can deploy the side-portion protection area 54 at the side of the occupant 3 as well, and deploy the back-portion protection area 55 between the back portion of the occupant 3 and the seatback 22 with its size which matches the size of the gap between the back portion of the occupant 3 and the seatback 22. The shape of the back-portion protection area 55 in the deployed state can be made to match a shape of the back of the occupant by increasing the number of the tether 8. The side airbag device 1 provided with the airbag 50 can compatibly attain optimization of the load distribution including the load applied to the high-resistance part of the skeleton structure of the human body and securement of the space between the occupant 3 and the side wall portion 4. Also, the side airbag device 1 is superior in the installation property.

Figure 8:
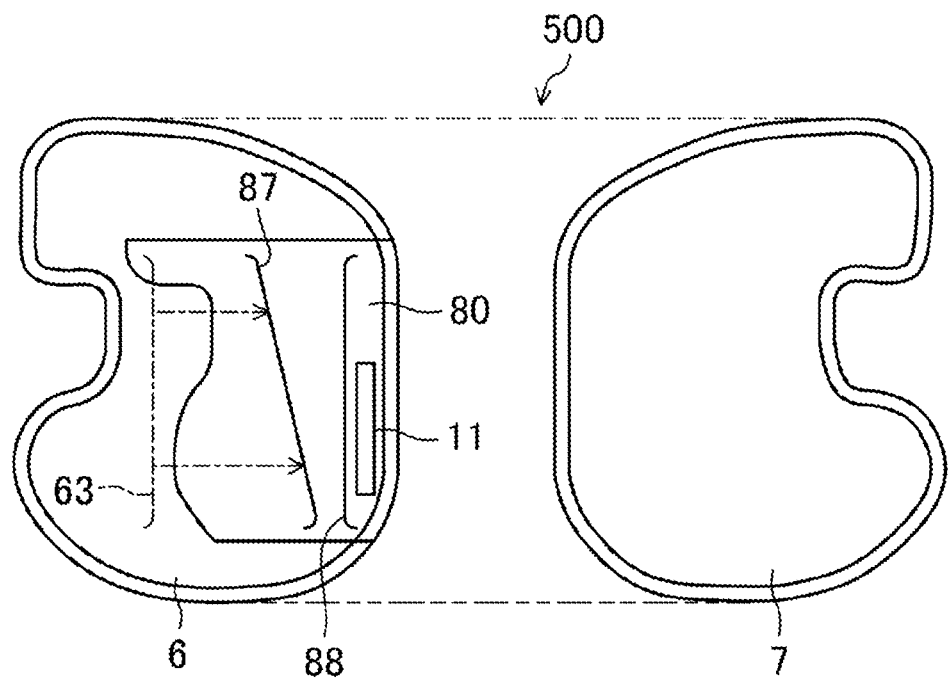
FIG. 8 is a plan sectional view showing an airbag according to another modification of the present invention, which corresponds to FIG. 4.

FIG. 8 shows another modification of the airbag. This modified airbag 500 is configured such that the upper-side tether and the lower-side tether are integrated. That is, there is provided a single tether 80. The tether 80 expands both in the vehicle longitudinal direction and in the vehicle vertical direction.

The tether 80 is provided with a front-side joint portion 87 and a rear-side joint portion 88. The front-side joint portion 87 and the rear-side joint portion 88 respectively extend in the vertical direction. The rear-side joint portion 88 extends vertically at the same position as the above-described rear-side joint portions 84, 86.

The front-side joint portion 87 is provided such that its upper end portion is located substantially at the same position as the above-described front-side joint portion 83 and its lower end portion is located substantially at the same position as the above-described front-side joint portion 85. That is, the front-side joint portion 87 slants relative to the longitudinal direction. A dotted line in FIG. 8 shows a reeled portion 63 of the inside base cloth 6 which is reeled rearwardly.

In this structure, a longitudinal length between the front-side joint portion 87 and the rear-side joint portion 88 is configured such that the one of its upper side is relatively long and the one of its lower side is relatively short.

The side airbag device 1 provided with this airbag 500 can deploy the side-portion protection area 54 at the side of the occupant 3 as well, and deploy the back-portion protection area 55 between the back portion of the occupant 3 and the seatback 22 with its size which matches the size of the gap between the back portion of the occupant 3 and the seatback 22. The side airbag device 1 provided with the airbag 500 can compatibly attain optimization of the load distribution including the load applied to the high-resistance part of the skeleton structure of the human body and securement of the space between the occupant 3 and the side wall portion 4. Also, the side airbag device 1 is so compact that it is superior in the installation property. Further, the structure of the airbag 500 becomes simple.

What is claimed is:
1. A side airbag device, comprising:
an inflator fixed to a side frame extending in a vehicle vertical direction inside a side portion of a seatback of a vehicle seat; and
an airbag deployed by inflation gas supplied from the inflator,
wherein said airbag comprises an inside base cloth which is provided to face an inward side in a vehicle width direction, an outside base cloth which is provided to face an outward side, in the vehicle width direction, of the inside base cloth and to be joined to the inside base cloth at a whole peripheral portion thereof, and a regulating member which is provided between the inside base cloth and the outside base cloth, and said airbag has a side-portion protection area which is deployed at the inward side in the vehicle vertical direction and a back-portion protection area which is deployed at the seatback, said regulating member is respectively joined to a front portion and a rear portion of said inside base cloth at a front-side joint portion and a rear-side joint portion, the length, in a vehicle longitudinal direction, between the front-side joint portion and the rear-side joint portion of said regulating member is set to be shorter than that between the front-side joint portion and the rear-side joint portion of said inside base cloth, whereby a joint state of the inside face cloth is loosened relative to the regulating member, said rear-side joint portion is set, in an airbag deployment state, to be positioned on a vehicle forward side of a front end portion of said side frame but on a vehicle rearward side of an imaginary line connecting a hip point and a center position of a shoulder portion of a human body dummy for side-collision test (AM50) seated in the vehicle seat in a vehicle side view, and said back-portion protection area of the airbag is constituted by a part of said inside base cloth, forward deployment of which is regulated by said regulating member.

2. The side airbag device of claim 1, wherein said regulating member is constituted by upper-side and lower-side regulating members which are provided side by side in the vehicle vertical direction, and the length, in the vehicle longitudinal direction, between the front-side joint portion and the rear-side joint portion of said lower-side regulating member is shorter than that between the front-side joint portion and the rear-side joint portion of said upper-side regulating member.

3. The side airbag device of claim 1, wherein said regulating member is constituted by a single regulating member provided with the front-side joint portion and the rear-side joint portion which are respectively configured to extend in the vehicle vertical direction, and the front-side joint portion of the single regulating member is configured to slant relative to the vehicle vertical direction such that the length, in the vehicle longitudinal direction, between the front-side joint portion and the rear-side joint portion of a lower side of the single regulating member is shorter than that between the front-side joint portion and the rear-side joint portion of an upper side of the single regulating member.

4. The side airbag device of claim 3, wherein said airbag further has a chest-portion protection area and a lumber-portion protection area positioned below the chest-portion protection area, and said chest-portion protection area is configured such that the length, in the vehicle longitudinal direction, thereof is shorter than that of said lumber-portion protection area in the airbag deployment state.

5. The side airbag device of claim 4, wherein said airbag further has a shoulder-portion protection area which is positioned above said chest-portion protection area, and said regulating member is provided below said shoulder-portion protection area.

6. A vehicle seat provided with the side airbag device of claim 5, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

7. The side airbag device of claim 1, wherein said airbag further has a chest-portion protection area and a lumber-portion protection area positioned below the chest-portion protection area, and said chest-portion protection area is configured such that the length, in the vehicle longitudinal direction, thereof is shorter than that of said lumber-portion protection area in the airbag deployment state.

8. A vehicle seat provided with the side airbag device of claim 1, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

9. The side airbag device of claim 2, wherein said airbag further has a chest-portion protection area and a lumber-portion protection area positioned below the chest-portion protection area, and said chest-portion protection area is configured such that the length, in the vehicle longitudinal direction, thereof is shorter than that of said lumber-portion protection area in the airbag deployment state.

10. A vehicle seat provided with the side airbag device of claim 2, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

11. A vehicle seat provided with the side airbag device of claim 3, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

12. A vehicle seat provided with the side airbag device of claim 4, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

13. The side airbag device of claim 7, wherein said airbag further has a shoulder-portion protection area which is positioned above said chest-portion protection area, and said regulating member is provided below said shoulder-portion protection area.

14. A vehicle seat provided with the side airbag device of claim 7, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

15. The side airbag device of claim 9, wherein said airbag further has a shoulder-portion protection area which is positioned above said chest-portion protection area, and said regulating member is provided below said shoulder-portion protection area.

16. A vehicle seat provided with the side airbag device of claim 9, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

17. A vehicle seat provided with the side airbag device of claim 13, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

18. A vehicle seat provided with the side airbag device of claim 15, wherein said airbag is configured such that said back-portion protection area is positioned on an inward side, in the vehicle width direction, of said side frame and said side-portion protection area is positioned on the outward side, in the vehicle width direction, of said side frame in a state where the airbag is stored inside the side portion of the seatback before deployment.

\* \* \* \* \*